(12) United States Patent
Grabau

(10) Patent No.: US 7,594,573 B2
(45) Date of Patent: Sep. 29, 2009

(54) CONVEYING APPARATUS

(75) Inventor: Thomas Grabau, Lübeck (DE)

(73) Assignee: Nordischer Maschinenbau Rud. Baader GmbH & Co. KG, Lubeck (DE)

( * ) Notice: Subject to any disclaimer, the term of this patent is extended or adjusted under 35 U.S.C. 154(b) by 0 days.

(21) Appl. No.: 11/995,140

(22) PCT Filed: May 12, 2006

(86) PCT No.: PCT/EP2006/004824

§ 371 (c)(1),
(2), (4) Date: Jan. 9, 2008

(87) PCT Pub. No.: WO2007/006365

PCT Pub. Date: Jan. 18, 2007

(65) Prior Publication Data

US 2008/0202897 A1  Aug. 28, 2008

(30) Foreign Application Priority Data

Jul. 9, 2005   (DE) ........................ 10 2005 032 752

(51) Int. Cl.
*B65G 15/60* (2006.01)
(52) U.S. Cl. ........................................ 198/841; 198/837

(58) Field of Classification Search ................. 198/497, 198/806, 837, 841
See application file for complete search history.

(56) References Cited

U.S. PATENT DOCUMENTS

| | | | | |
|---|---|---|---|---|
| 5,164,777 A | * | 11/1992 | Agarwal et al. | 198/841 |
| 5,365,321 A | * | 11/1994 | Koshimizu et al. | 198/806 |
| 5,826,703 A | * | 10/1998 | Altemus et al. | 198/823 |
| 7,073,661 B2 | * | 7/2006 | Wilmo et al. | 198/841 |
| 7,159,706 B2 | * | 1/2007 | Wilmo et al. | 198/497 |

FOREIGN PATENT DOCUMENTS

GB        1370882      * 10/1974

* cited by examiner

*Primary Examiner*—James R Bidwell
(74) *Attorney, Agent, or Firm*—Mattingly & Malur, P.C.

(57) ABSTRACT

The invention concerns a conveying apparatus, essentially including an endless conveying element which is guided over several deflecting elements and comprises a conveying sector and a return sector, the conveying sector defining a conveying plane E, a drive for the conveying element and elements for centering the conveying element, which is distinguished by the fact that at least the deflecting elements arranged at opposite ends of the conveying sector are designed as elements for centering the conveying element transversely to the direction of transport T with an inwardly directed shape.

12 Claims, 3 Drawing Sheets

CONVEYING APPARATUS

Figure 1:
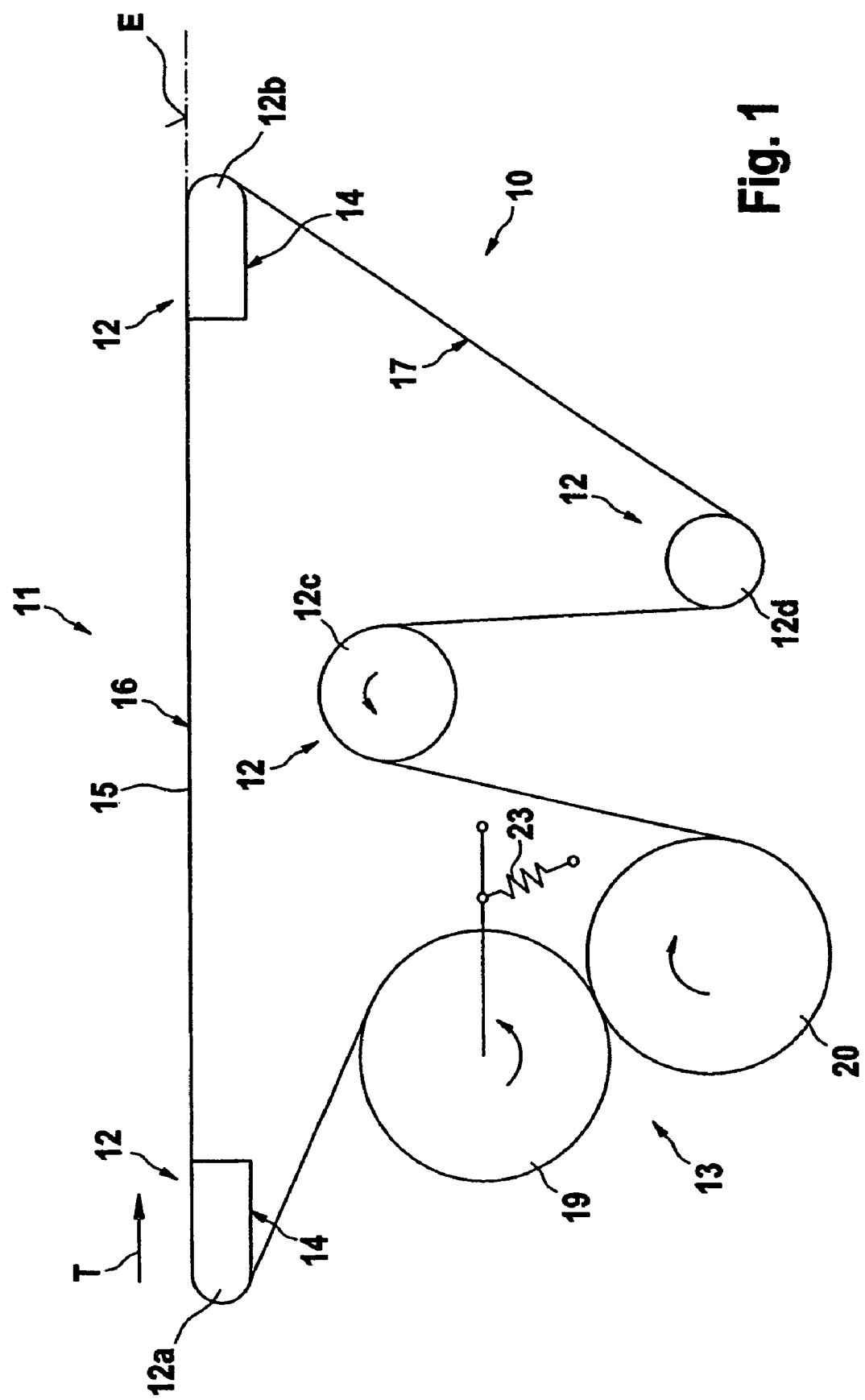

The invention concerns a conveying apparatus, essentially including an endless conveying element which is guided over several deflecting elements and comprises a conveying sector and a return sector, the conveying sector defining a conveying plane, a drive for the conveying element and elements for centering the conveying element.

Apparatuses of this kind are used in different industrial fields. In particular in the fish-processing industry, the generic conveying apparatuses are used for example in connection with skinning machines. In this case it is necessary to centre the conveying elements, which frequently move rapidly round the deflecting elements, centrally in their travel in order to ensure uniform and continuous operation.

Apparatuses which are equipped with lateral guide plates, wedge strips or the like for centering the conveying element are known. However, it has been shown that in particular thin and flexible conveying elements, e.g. conveyor belts, which move rapidly over the deflecting elements cannot be guided sustainably and reliably. On the contrary, the conveying elements move, particularly in such cases, laterally of the deflecting elements if transverse forces arise, for example due to the action of processing tools. Other possible ways of centering, for example tilting of rollers, guides for the wedge strips or rolling deflecting elements, likewise have not obtained the desired effect.

It is therefore the object of the present invention to improve a conveying apparatus of the kind mentioned hereinbefore to the effect that reliable guiding or centering of the conveying element during operation is guaranteed.

This object is achieved by a conveying apparatus having the features of the introductory part of the claim, by the fact that at least the deflecting elements, stationary blade edges, arranged at opposite ends of the conveying sector are designed as elements for centering the conveying element transversely to the direction of transport T with an inwardly directed shape. Due to this design of the deflecting elements according to the invention at least in the region of the conveying sector it is ensured that the conveying element remains reliably in the desired track, particularly at high speeds of travel as well. The depression which, starting from the edge of the deflecting elements, runs inwardly and which forms a kind of channel running in the direction of transport effectively prevents the conveying element from overriding the edge and jumping off. With the inwardly hollowed-out blade edges, self-centering of the conveying element is achieved in a particularly reliable manner.

Preferably, at least the deflecting elements arranged at the opposite ends of the conveying sector are designed as blade edges. With the inwardly hollowed-out blade edges, self-centering of the conveying element is achieved in a particularly reliable manner.

In a preferred embodiment of the invention, the two deflecting elements in the region of the conveying sector are of concave design. This shape has proved to be particularly reliable in centering the conveying element and particularly easy to make.

Advantageously, the drive is designed as a so-called compression drive. Due to the fact that driving takes place by two rollers which are synchronised in speed, the tension of the conveying element is greatly reduced. At the output of the compression drive the tension of the conveying element is almost zero. This in turn leads to the friction between conveying element and deflecting elements being reduced. Furthermore, the above effect influences the durability of the conveying element by prolonging the service life of the conveying element.

In an advantageous embodiment of the invention the conveying element particularly in the region of deflection points or bends in the return sector can be guided round further deflecting elements which are designed as rollers and/or rods. Preferably the deflecting elements in the region of the return sector are optionally stationary and/or movable, all stationary deflecting elements being concave and all movable deflecting elements being convex. With the distribution of further stationary and/or movable deflecting elements over the whole length of the conveying element, centering of the conveying element is further assisted and improved.

Figure 2:
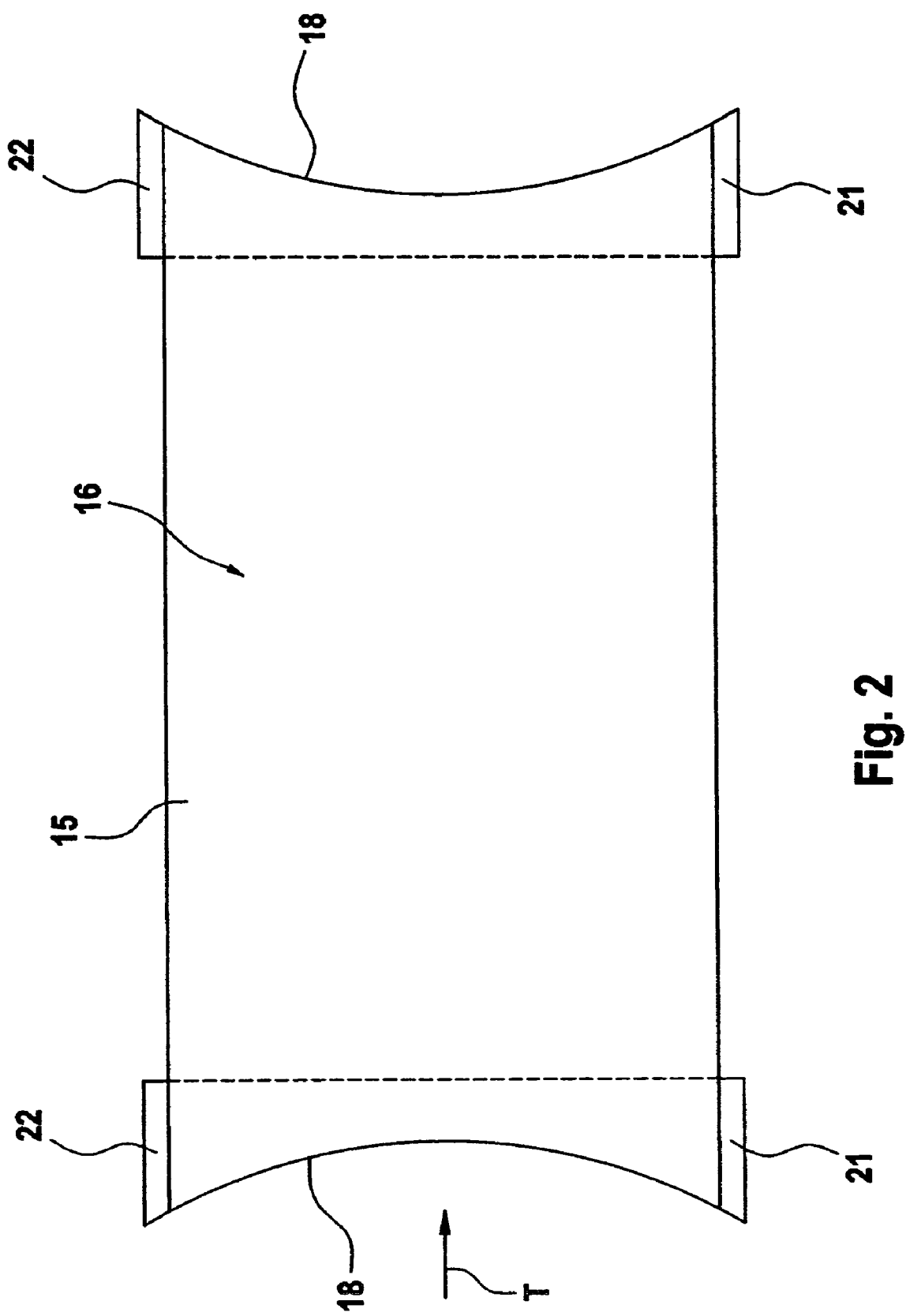
Figure 3A:
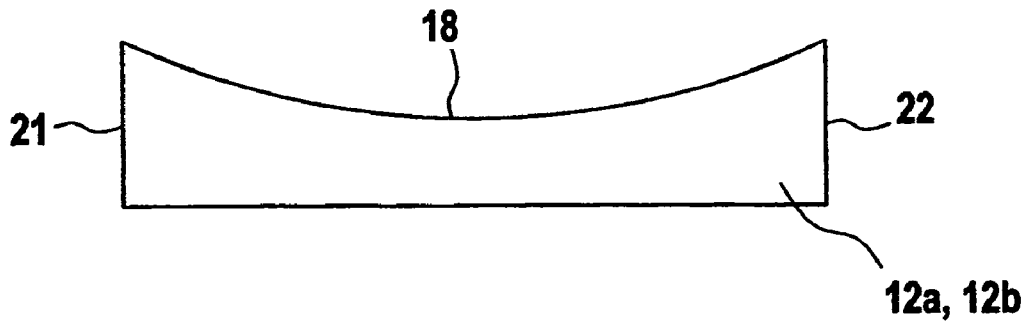
Figure 3B:
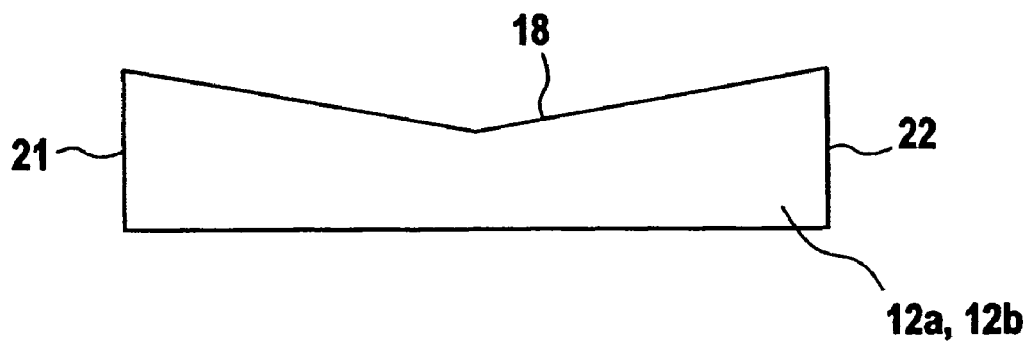
Figure 3C:
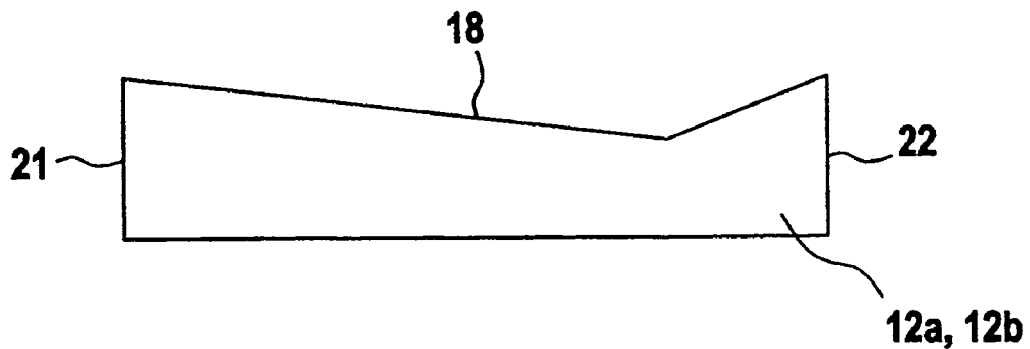

Further preferred embodiments and advantageous features of the invention are apparent from the subsidiary claims and the description. A particularly preferred embodiment is described in more detail with the aid of the attached drawings. The drawings show:

FIG. 1 a schematic side view of the conveying apparatus with a compression drive, FIG. 2 a top view of the conveying apparatus as in FIG. 1 with concave blade edges, and FIG. 3a to 3c different embodiments of the design of the deflecting elements in the region of the conveying sector.

The shown conveying apparatus serves as a so-called centre belt or guide belt in a skinning apparatus for fish. Naturally the conveying apparatus can also be used universally in other fields.

The conveying apparatus 10 according to FIG. 1 essentially includes an endless conveying element 11 which is guided over several deflecting elements 12, a drive 13 and elements 14 for centering the conveying element 11 for central travel of the conveying element 11 on the deflecting elements 12. The conveying element 11 is formed as a thin and flexible conveyor belt 15, advantageously made of a flexible material, e.g. rubber, polyurethane or the like, and has a conveying sector 16 and a return sector 17. However, the conveyor belt 15 can also be made of other flexible materials with or without fabric reinforcement. The conveying sector 16 is the region on which the products, in this case fish fillets, are conveyed. The conveying sector 16 is preferably oriented horizontally and defines the actual conveying plane E. The return sector 17 usually runs beneath the conveying plane E.

As already mentioned above, the conveyor belt 15 is guided round several deflecting elements 12. At least two of the deflecting elements 12, namely the deflecting elements 12a and 12b, are arranged in the region of the conveying sector 16, this being at opposite ends of the conveying sector 16. To be more precise, the above-mentioned deflecting elements 12a and 12b are located in the region of the input and output of the conveying apparatus 10. The deflecting elements 12a and 12b in the region of the conveying sector 16 are designed so as to ensure transfer of the products conveyed in the direction of transport T without damage. The deflecting elements 12a, 12b have a shape which is formed or directed inwardly transversely to the direction of transport T. To put it another way, the deflecting elements 12a and 12b in each case drop down from the outside to the inside along their length, so that the deflecting elements 12a and 12b have the lowest point along the zone between the two outer edges 21, 22. As a result the deflecting elements 12a and 12b serve as an element 14 for centering. To put it another way, the elements 14 for centering form an integral part of the deflecting elements 12a and 12b.

In the shown embodiment the deflecting elements 12a and 12b in the region of the conveying sector 16 are designed as blade edges 18. The blade edges 18 are stationary bodies having a radius in the region of the transition from the conveying sector 16 to the return sector 17, and vice versa. In a further embodiment, not shown, the deflecting elements 12a and 12b in the region of the conveying sector 16 can also be other deflecting bodies or deflecting edges. These usually stationary deflecting bodies/deflecting edges have a maximum diameter of about 16 to 20 mm in the edge region 21, 22. The two deflecting elements 12a and 12b, that is, the blade edges 18, deflecting bodies or corresponding elements are concave in the region of the conveying sector 16, such that the curvature is directed downwards in a trough shape from the conveying plane E.

FIGS. 3a to 3c show different embodiments of the deflecting elements 12a and 12b, this involving only shapes by way of example. The deflecting elements 12a, 12b can be designed with a curvature or linear inclined surfaces. Apart from a symmetrical design (FIGS. 3a and 3b), asymmetrical shapes (FIG. 3c) can also be provided. Preferably, however, each deflecting element 12a, 12b has the lowest point centrally between the outer edges 21, 22.

The deflecting elements 12a and 12b can be made of different materials. Construction from plastic is preferred. But other, optionally coated or uncoated and/or hardened materials can be used as well.

Driving of the conveyor belt 15 can take place by conventional belt drives with a single drive roller. In the embodiment described, the drive 13 is a compression drive. In the compression drive, driving takes place by two movable rollers 19, 20 which are synchronised in speed, the conveyor belt 15 being guided between these rollers 19, 20. At the output of the compression drive, the tension of the conveyor belt 15 is therefore almost zero. At least one of the rollers 19 is pushed or pulled against the other roller 20 under spring load with a corresponding spring 23, to produce the compression connection. Since this is a traditional compression drive, a detailed description is dispensed with.

In addition to the deflecting elements 12a and 12b, further deflecting elements 12 are provided during further travel of the belt, that is, in particular in the return sector 17. These deflecting elements 12 are preferably arranged in the region of deflection points or bends of the conveyor belt 15. In the embodiment shown in FIG. 1, two additional deflecting elements 12 are provided. The number of deflecting elements 12 is variable, however. Of the deflecting elements 12 shown, one deflecting element 12c is movable, this being designed as a deflecting roller. The other deflecting element 12d is a stationary deflecting rod. The or each movable deflecting element 12c has a convex shape. Due to the capacity of the deflecting element 12c for movement, the spherical shape leads to centering of the conveyor belt 15. The stationary deflecting element 12d is, like the deflecting elements 12a and 12b and all other possible stationary deflecting elements 12, concave. Like the deflecting elements 12a and 12b, all further deflecting elements 12c and 12d can optionally be formed from plastic or other materials.

The invention claimed is:

1. Conveying apparatus, essentially including an endless conveying element which is guided over several deflecting elements and comprises a conveying sector and a return sector, the conveying sector defining a conveying plane E, a drive for the conveying element and elements for centering the conveying element, characterised in that at least the deflecting elements constructed as stationary blade edges, arranged at opposite ends of the conveying sector are designed as elements for centering the conveying element transversely to the direction of transport T with an inwardly directed shape.

2. Conveying apparatus according to claim 1, characterised in that the two deflecting elements in the region of the conveying sector are of concave design.

3. Conveying apparatus according to claim 1, characterised in that the two deflecting elements in the region of the conveying sector are formed from plastic.

4. Conveying apparatus according to claim 1, characterised in that the drive is a compression drive.

5. Conveying apparatus according to claim 1, characterised in that the conveying element is a conveyor belt made of flexible material.

6. Conveying apparatus according to claim 1, characterised in that the conveying element particularly in the region of deflection points or bends in the return sector is guided round further deflecting elements which are designed as rollers and/or rods.

7. Conveying apparatus according to claim 6, characterized in that the deflecting elements in the region of the return sector are optionally stationary and/or movable.

8. Conveying apparatus according to claim 7, characterised in that in the region of the return sector are provided at least one moveable deflecting element and at least one stationary deflecting element.

9. Conveying apparatus according to claim 7, characterised in that the moveable deflecting element in the region of the return sector is a rotatable deflecting roller, and the stationary deflecting element in the region of the return section is a deflecting rod.

10. Conveying apparatus according to claim 7, characterised in that all stationary deflecting elements are concave and all movable deflecting elements are convex.

11. Conveying apparatus according to claim 7, characterised in that all stationary deflecting elements are formed train plastics.

12. Conveying apparatus according to claim 1, characterised in that all deflecting elements are formed from plastic.

* * * * *